US012586521B2

(12) United States Patent
Li et al.

(10) Patent No.: US 12,586,521 B2
(45) Date of Patent: Mar. 24, 2026

(54) DISPLAY PANEL, DISPLAY DEVICE, AND METHOD FOR DRIVING DISPLAY PANEL

(71) Applicants: Chengdu BOE Optoelectronics Technology Co., Ltd., Chengdu (CN); BOE Technology Group Co., Ltd., Beijing (CN)

(72) Inventors: Jian Li, Beijing (CN); Xuesong Tian, Beijing (CN); Yuanzhang Zhu, Beijing (CN); Shuai Hou, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 158 days.

(21) Appl. No.: 18/579,497

(22) PCT Filed: Apr. 17, 2023

(86) PCT No.: PCT/CN2023/088605
§ 371 (c)(1),
(2) Date: Jan. 15, 2024

(87) PCT Pub. No.: WO2024/216420
PCT Pub. Date: Oct. 24, 2024

(65) Prior Publication Data
US 2025/0078741 A1 Mar. 6, 2025

(51) Int. Cl.
*G09G 3/3225* (2016.01)

(52) U.S. Cl.
CPC ... *G09G 3/3225* (2013.01); *G09G 2300/0819* (2013.01); *G09G 2300/0842* (2013.01); *G09G 2310/04* (2013.01); *G09G 2320/0271* (2013.01)

(58) Field of Classification Search
CPC .......... G09G 3/20; G09G 3/32; G09G 3/3225; G09G 3/3223; G09G 3/3266;
(Continued)

(56) References Cited

U.S. PATENT DOCUMENTS

2014/0098302 A1* 4/2014 Rumreich ............ H04N 9/3135 353/31
2014/0368484 A1 12/2014 Tanaka et al.
(Continued)

FOREIGN PATENT DOCUMENTS

CN 106935208 A 7/2017
CN 115113760 A 9/2022
(Continued)

*Primary Examiner* — Cory A Almeida
(74) *Attorney, Agent, or Firm* — IPro, PLLC

(57) ABSTRACT

Provided is a display panel. The display panel is provided with a display region, and the display panel includes: a plurality of pixel units disposed in arrays in the display region; the display region is divided into a first dynamic refresh region, a second dynamic refresh region, and at least one first transition refresh region between the first dynamic refresh region and the second dynamic refresh region; a refresh rate of pixel units in the first dynamic refresh region is different from a refresh rate of pixel units in the second dynamic refresh region; a refresh rate of pixel units in each of the first transition refresh regions is between the refresh rates of the pixel units in the first dynamic refresh region and the second dynamic refresh region.

14 Claims, 6 Drawing Sheets

(58) Field of Classification Search
CPC ... G09G 2300/0819; G09G 2300/0842; G09G 2310/04; G09G 2320/0271
See application file for complete search history.

(56) References Cited

U.S. PATENT DOCUMENTS

| | | | | |
|---|---|---|---|---|
| 2016/0042707 A1* | 2/2016 | Wang | G09G 3/3266 345/214 |
| 2016/0125785 A1* | 5/2016 | Wang | G09G 3/3648 345/582 |
| 2022/0308696 A1 | 9/2022 | Lee et al. | |
| 2023/0136814 A1* | 5/2023 | Kim | G06F 3/1431 345/204 |

FOREIGN PATENT DOCUMENTS

| | | | |
|---|---|---|---|
| CN | 115224098 | A | 10/2022 |
| CN | 115311996 | A | 11/2022 |
| WO | 2013115088 | A1 | 8/2013 |

* cited by examiner

DISPLAY PANEL, DISPLAY DEVICE, AND METHOD FOR DRIVING DISPLAY PANEL

CROSS-REFERENCE TO RELATED APPLICATION

This application is a U.S. national phase application based on PCT/CN2023/088605, filed on Apr. 17, 2023, the content of which is incorporated herein by reference in its entirety.

TECHNICAL FIELD

The present disclosure belongs to the field of display technologies, and in particular, relates to a display panel, a display device, and a method for driving the display panel.

BACKGROUND

With the pursuit of consumers on the extremely high power-consumption of display devices, a low temperature polycrystalline oxide (LTPO) display panel is designed, such that the display with a low refresh rate (the lowest 1 Hz) can be achieved, and the effect of reducing the power consumption is achieved. Many manufacturers now propose a partial update scheme; namely, a display panel is divided into several regions, and a different refresh rate can be set for each region. By the partial update, a refresh region is updated, and a non-refresh region remains unchanged, thereby achieving more intelligent refreshing, and saving power consumption.

SUMMARY

The present disclosure provides a display panel, a display device, and a method for driving the display panel.

In a first aspect, embodiments of the present disclosure provide a display panel, wherein the display panel is provided with a display region and includes a plurality of pixel units disposed in arrays in the display region;

- wherein the display region is divided into a first dynamic refresh region, a second dynamic refresh region, and at least one first transition refresh region between the first dynamic refresh region and the second dynamic refresh region;
- a refresh rate of pixel units in the first dynamic refresh region is different from a refresh rate of pixel units in the second dynamic refresh region;
- a refresh rate of pixel units in each of the first transition refresh regions is between the refresh rates of the pixel units in the first dynamic refresh region and the second dynamic refresh region; and
- a number of rows of the pixel units in the first transition refresh region is at least less than a number of rows of the pixel units in the first dynamic refresh region and a number of rows of the pixel units in the second dynamic refresh region.

In some embodiments, the refresh rate of the pixel units in the first dynamic refresh region is greater than the refresh rate of the pixel units in the second dynamic refresh region.

In some embodiments, the refresh rate of the pixel units in each of the first transition refresh regions gradually decreases along a direction from the first dynamic refresh region to the second dynamic refresh region.

In some embodiments, the display region is further divided into a static retention region, and at least one second transition refresh region between the second dynamic refresh region and the static retention region;

- a refresh rate of pixel units in the static retention region is 1 Hz;
- a refresh rate of pixel units in the at least one second transition refresh region is between the refresh rates of the pixel units in the second dynamic refresh region and the static retention region.

In some embodiments, the refresh rate of the pixel units in each of the second transition refresh regions gradually decreases along a direction from the second dynamic refresh region to the static retention region.

In some embodiments, the display panel is further provided with a peripheral region disposed on at least one side of the display region, and the display panel further includes a plurality of shift registers and gating circuits disposed in the peripheral region, wherein each of the shift registers is connected to one row of the pixel units through the gating circuit; the gating circuit includes a signal generation sub-circuit, a correction sub-circuit, and an output sub-circuit; and

- the shift register is configured to output a gate drive signal stage by stage according to a preset time sequence;
- wherein the signal generation sub-circuit is configured to generate a gating signal according to the refresh rates of the pixel units in the first dynamic refresh region and the second dynamic refresh region;
- the correction sub-circuit is configured to correct the gating signal according to the refresh rate of the pixel units in the first transition refresh region;
- the output sub-circuit is configured to input the gate drive signal to corresponding pixel units under a control of a corrected gating signal.

In some embodiments, the correction sub-circuit is specifically configured to,

- acquire, according to the refresh rates of the pixel units in the first dynamic refresh region and the second dynamic refresh region, a number of frames spaced between hopping of gating signals corresponding to the first dynamic refresh region and the second dynamic refresh region;
- acquire, according to the number of frames spaced between the hopping of the gating signals corresponding to the first dynamic refresh region and the second dynamic refresh region, a number of frames spaced between hopping of gating signal corresponding to the first transition refresh region; and
- correct the gating signals according to the number of frames spaced between the hopping of the gating signal corresponding to the first transition refresh region.

In some embodiments, the number of frames spaced between the hopping of the gating signal corresponding to the first transition refresh region is between the number of frames spaced between the hopping of the gating signals corresponding to the first dynamic refresh region and the second dynamic refresh region.

In some embodiments, the number of frames spaced between the hopping of the gating signal corresponding to each of the first transition refresh regions gradually increases along the direction from the first dynamic refresh region to the second dynamic refresh region.

In some embodiments, the signal generation sub-circuit is further configured to generate a gating signal according to the refresh rate of the pixel units in the static retention region;

- the correction sub-circuit is further configured to correct the gating signal according to the refresh rate of the pixel units in the second transition refresh region.

In some embodiments, the correction sub-circuit is further specifically configured to, acquire, according to the refresh rate of the pixel units in the static retention region, a number of frames spaced between hopping of the gating signal corresponding to the static retention region;

acquire, according to a number of frames spaced between the hopping of the gating signals corresponding to the second dynamic refresh region and the static retention region, a number of frames spaced between hopping of the gating signal corresponding to the second transition refresh region; and correct the gating signals according to the number of frames spaced between the hopping of the gating signal corresponding to the second transition refresh region.

In some embodiments, the number of frames spaced between the hopping of the gating signal corresponding to the second transition refresh region is between the number of frames spaced between the hopping of the gating signals corresponding to the second dynamic refresh region and the static retention region.

In some embodiments, the number of frames spaced between the hopping of the gating signal corresponding to each of the second transition refresh regions gradually increases along the direction from the second dynamic refresh region to the static retention region.

In some embodiments, at an end of a display period, the gating signal corresponding to the static retention region is forced to make a one-time hopping.

In a second aspect, embodiments of the present disclosure provide a display device, wherein the display device includes the display panel according to the above embodiments.

In a third aspect, embodiments of the present disclosure provide a method for driving the display panel according to the above embodiments, wherein the method for driving the display panel includes:

outputting a gate drive signal stage by stage according to a preset time sequence;

generating a gating signal according to the refresh rates of the pixel units in the first dynamic refresh region and the second dynamic refresh region;

correcting the gating signal according to the refresh rate of the pixel units in the first transition refresh region; and inputting the gate drive signal to the corresponding pixel units under a control of a corrected gating signal.

In some embodiments, prior to inputting the gate drive signal to the corresponding pixel units under the control of the corrected gating signal, the method further includes:

generating a gating signal according to the refresh rates of the pixel units in the second dynamic refresh region and refresh rates of pixel units in a static retention region; and correcting the gating signal according to refresh rate of pixel units in a second transition refresh region.

DETAILED DESCRIPTION

To enable those skilled in the art to better understand the technical solutions of the present disclosure, the following detailed description is given with reference to the accompanying drawings and the specific embodiments.

Unless otherwise defined, technical or scientific terms used in detailed description of the present disclosure should have the ordinary meanings as understood by those of ordinary skill in the art to which the present disclosure belongs. "First," "second," and other similar words, as used in the present disclosure, do not indicate any order, quantity, or importance, but are merely defined to distinguish different components. Likewise, "a," "an," "the," or other similar words do not indicate a limitation of quantity, but rather the presence of at least one. "Comprise," "include," or other similar words mean that the elements or objects stated before the word encompass the elements or objects and equivalents thereof listed after the word, but do not exclude other elements or objects. "Connecting," "connected," or other similar words are not limited to physical or mechanical connections, but may include electrical connections, whether direct or indirect. "Up," "down," "left," "right," and the like are merely defined to indicate relative positional relationships. In the case that the absolute position of a described object changes, the relative position relationship may also change accordingly.

The partial update is now mainly achieved by controlling whether gate drive signals enter pixel circuits or not, controlling the minimum refreshing within an entire row of pixel circuits. However, the display panel is divided into several refresh regions, and the optical parameters between the pixel circuits with high refresh rates and low refresh rates in adjacent regions are difficult to keep consistent, such that a distinct luminance boundary is present, thereby affecting the display effect.

Figure 1:
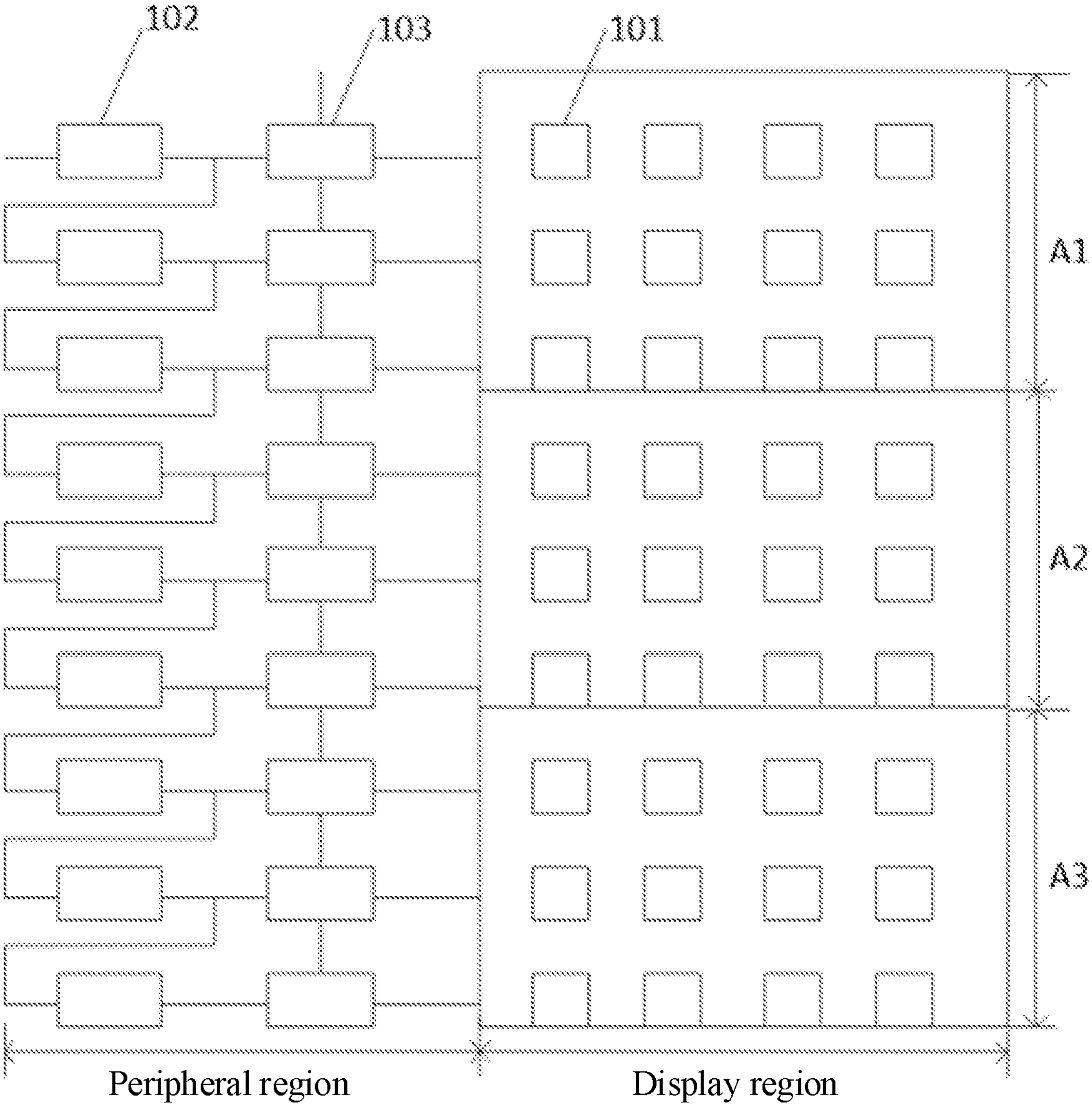
FIG. 1 is a schematic structural diagram of an exemplary display panel.

The LTPO display panel allows for ultra-refresh rate display, and thus is widely applied in various fields. FIG. 1 is a schematic structural diagram of an exemplary display panel. As shown in FIG. 1, the display panel is provided with a display region, and a peripheral region disposed on at least one side of the display region; and the display panel includes: a plurality of pixel units 101 disposed in arrays in the display region, a plurality of shift registers 102 and gating circuits 103 disposed in the peripheral region, wherein each of the shift registers 102 is connected to one row of the pixel units 101 through the gating circuit 103.

The display region is divided into a first dynamic refresh region A1, a second dynamic refresh region A2, and a static retention region A3, wherein a refresh rate of pixel units 101 in the first dynamic refresh region A1 is 120 Hz, and the refreshing maintains at a high rate; the refresh rate of pixel units 101 in the second dynamic refresh region A2 is 40 Hz, and the refreshing maintains at a low rate; the refresh rate of pixel units 101 in the static retention region A3 is 1 Hz. Thus, the display images remain unchanged within one display period, thereby achieving partial update display and saving energy consumption. It should be noted that, one display period herein is specifically one second, the first dynamic refresh region A1 displays 120 frames of display images within one second, the second dynamic refresh region A2 displays 40 frames of display images within one second, and the static retention region A3 displays one frame of display image within 1 second.

The pixel unit 101 is provided with a pixel circuit, and the pixel circuit is of a circuit structure having 7T1C (7 thin-film transistors and 1 storage capacitor) or 8T1C (8 thin-film transistors and 1 storage capacitor). As the circuit structure of 8T1C has a third initial signal for adjustment, it has a better frequency switching effect and a flicker prevention effect. Therefore, the circuit structure of 8T1C is generally adopted.

Figure 2:
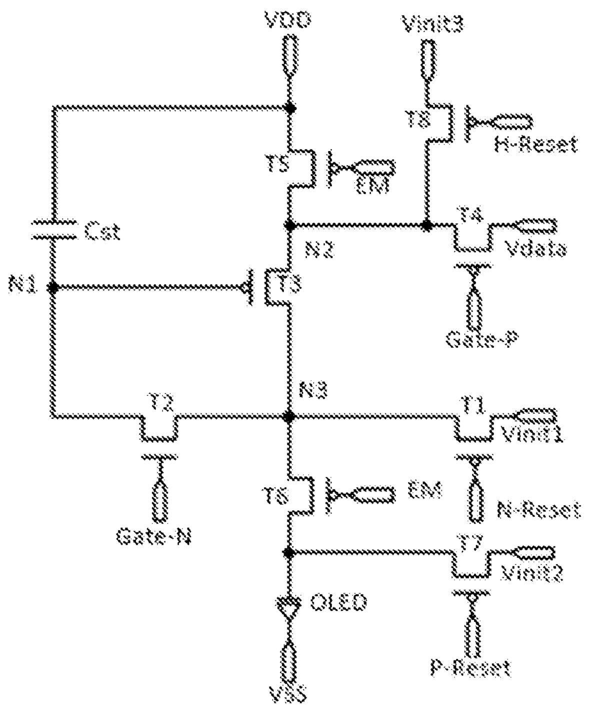
FIG. 2 is a schematic structural diagram of an exemplary pixel circuit in the display panel shown in FIG. 1.

FIG. 2 is a schematic structural diagram of an exemplary pixel circuit in the display panel shown in FIG. 1. As shown in FIG. 2, the pixel circuit includes: a first initialization transistor T1, a threshold compensation transistor T2, a driver transistor T3, a data writing transistor T4, a first light-emitting control transistor T5, a second light-emitting control transistor T6, a second initialization transistor T7, a third initialization transistor T8, a storage capacitor Cst, and an organic light-emitting device (OLED).

A gate of the driver transistor T3 is connected to a first node N1, a source thereof is connected to a second node N2, and a drain thereof is connected to a third node N3. A gate of the data writing transistor T4 is connected to a scanning signal line Gate-P, a source thereof is connected to a data signal line Vdata, and a drain thereof is connected to the second node N2. A gate of the threshold compensation transistor T2 is connected to a threshold compensation signal Gate-N, a source thereof is connected to the third node N3, and a drain thereof is connected to the first node N1. One terminal of the storage capacitor Cst is connected to the first node N1, and the other terminal thereof is connected to a first power signal line VDD. A gate of the first light-emitting control transistor T5 is connected to a light-emitting control signal line EM, a source thereof is connected to the first power signal line VDD, and a drain thereof is connected to the second node N2. A gate of the second light-emitting control transistor T6 is connected to the light-emitting control signal line EM, a source thereof is connected to the third node N3, and a drain thereof is connected to an anode of the organic light-emitting device OLED. A gate of the first initialization transistor T1 is connected to a first reset signal line N-Rreset, a source thereof is connected to a first initialization signal line Vinit1, and a drain thereof is connected to the third node N3. A gate of the second initialization transistor T7 is connected to a second reset signal line P-Reset, a source thereof is connected to a second initialization signal line Vinit2, and a drain thereof is connected to the anode of the organic light-emitting device OLED. A gate of the third initialization transistor T8 is connected to a third reset signal line H-Reset, a source thereof is connected to a third initialization signal line Vinit3, and a drain thereof is connected to the second node N2. The anode of the organic light-emitting device OLED is connected to the drain of the second light-emitting control transistor T6, and a cathode thereof is connected to a second power signal line VSS.

The first initialization transistor T1 and the threshold compensation transistor T2 are N-type transistors. For example, the first initialization transistor T1 and the threshold compensation transistor T2 are N-type metal oxide thin-film transistors having small leakage currents, such that current leakage at the first node N through the threshold compensation transistor T2 is avoided at the light emission stage. Meanwhile, the driver transistor T3, the data writing transistor T4, the first light-emitting control transistor T5, the second light-emitting control transistor T6, the second initialization transistor T7, and the third initialization transistor T8 are P-type transistors. For example, the driver transistor T3, the data writing transistor T4, the first light-emitting control transistor T5, the second light-emitting control transistor T6, the second initialization transistor T7, and the third initialization transistor T8 are P-type low temperature poly-silicon thin-film transistors having high carrier mobility, which are beneficial to the manufacture of a display panel with high resolution, high reaction speed, high pixel density, and high aperture ratio. The first initialization signal line Vinit1, the second initialization signal line Vinit2, and the third initialization signal line Vinit3 output the same or different voltage signals according to actual conditions.

At the data writing and threshold compensation stage, the data writing transistor T4 and the threshold compensation transistor T2 are turned on, a data signal and a threshold voltage of the driver transistor T3 are written to the first node N1, that is, the gate of the driver transistor T3, and the luminance of the organic light-emitting device OLED is adjusted by controlling the degree of turning on the gate of the driver transistor T3. For each row of pixel units 101, the organic light-emitting devices OLEDs therein emit light once, which means that the refreshing is performed once. The gate drive signals of the data writing transistor T4 and the threshold compensation transistor T2 are provided by a first gate drive circuit Pgate GOA and a second gate drive circuit Ngate GOA, respectively. In practice, the gating circuit 103 controls whether or not to input the gate drive signal to the row of the pixel units 101, so as to control the refresh rate. For example, the gate drive signal provided by the second gate drive circuit Ngate GOA is controlled to be input to the corresponding row of the pixel units 101, the organic light-emitting devices OLEDs in the row of the pixel units 101 emit light once, and the row of the pixel units 101 are refreshed once.

Figure 3:
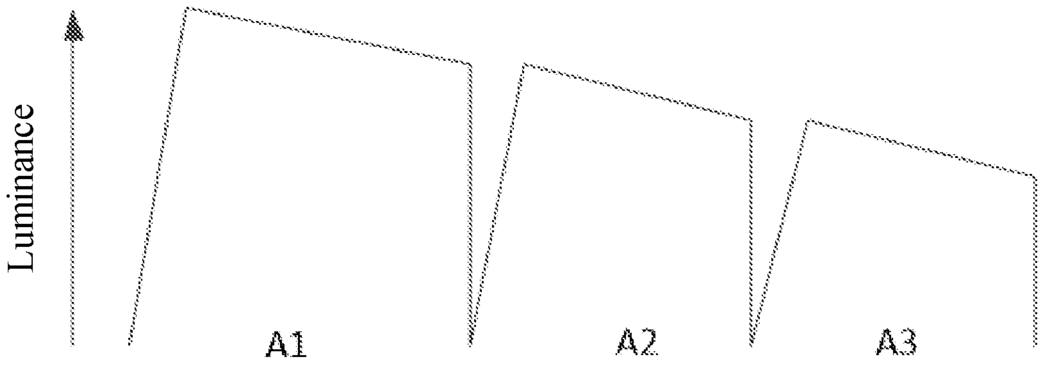
FIG. 3 is a schematic diagram of luminance of each region of the display panel shown in FIG. 1.

Although each of the transistors in the LTPO display panel maintains the data voltage well and achieves low frequency display, in practice, a slight leakage of currents is still present in some transistors in the LTPO display panel, such that the luminance of the first dynamic refresh region A1, the luminance of the second dynamic refresh region A2, and the luminance of the static retention region A3 are different (the luminance diagram is shown in FIG. 3), and then a distinct luminance boundary is present due to the large luminance difference at the boundary, thereby affecting the display effect.

To solve at least one of the above technical problems, the embodiments of the present disclosure provide a display panel, a display device, and a method for driving the display panel. The display panel, the display device, and the method for driving the display panel according to the embodiments of the present disclosure will be described in further detail with reference to the accompanying drawings and specific embodiments.

Figure 4:
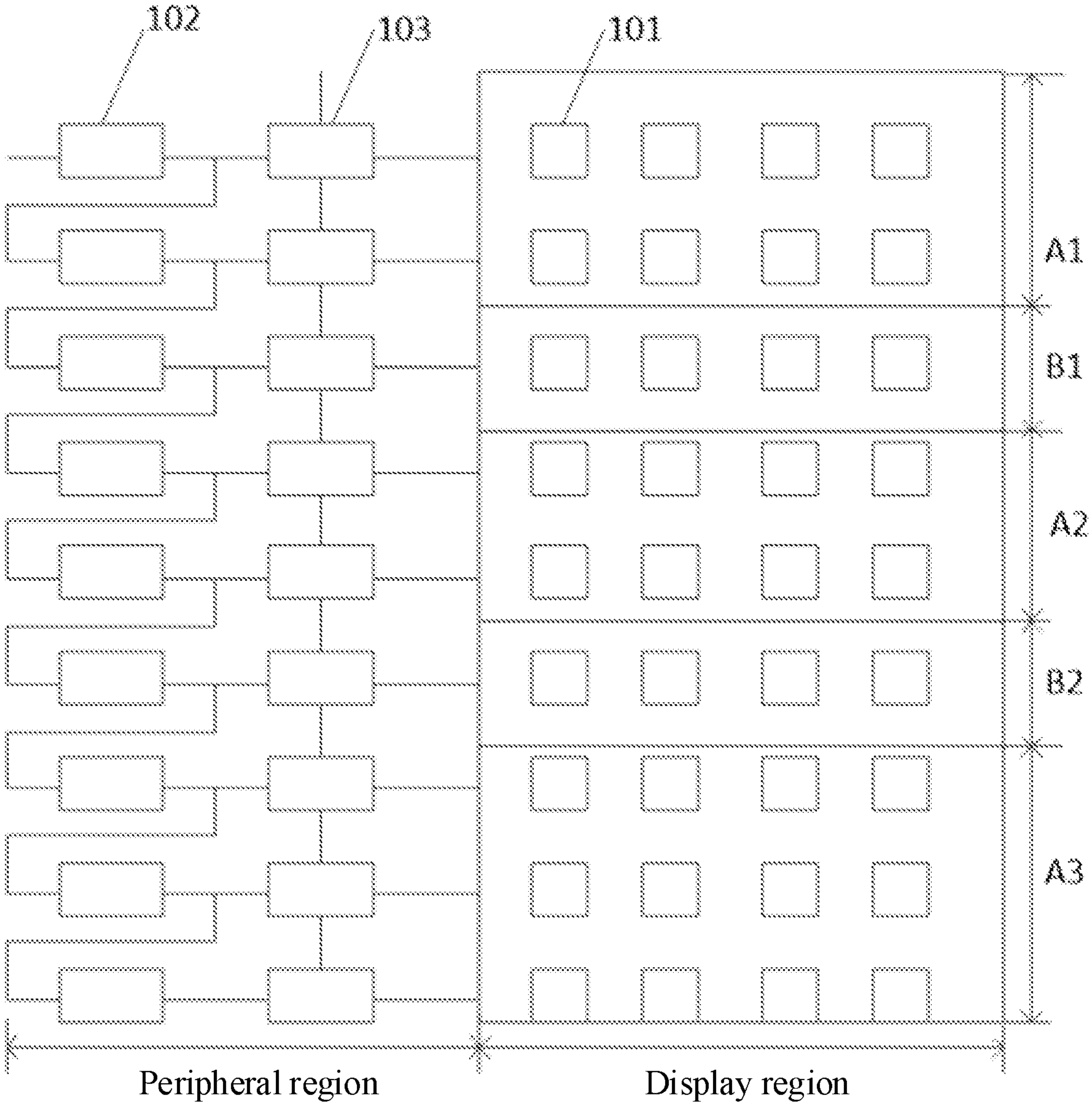
FIG. 4 is a schematic structural diagram of a display panel according to some embodiments of the present disclosure.

FIG. 4 is a schematic structural diagram of a display panel according to some embodiments of the present disclosure. As shown in FIG. 4, the display panel is provided with a display region, and the display panel includes: a plurality of pixel units 101 disposed in arrays in the display region. The display region is divided into a first dynamic refresh region A1, a second dynamic refresh region A2, and at least one first transition refresh region B1 between the first dynamic refresh region A1 and the second dynamic refresh region A2. A refresh rate of pixel units 101 in the first dynamic refresh region A1 is different from a refresh rate of pixel units 101 in the second dynamic refresh region A2; a refresh rate of pixel units 101 in each of the first transition refresh regions B1 is between the refresh rates of the pixel units 101 in the first dynamic refresh region A1 and the second dynamic refresh region A2.

The refresh rate of the pixel units 101 in the first dynamic refresh region A1 is 120 Hz, and the refreshing maintains at a high rate; the refresh rate of pixel units 101 in the second dynamic refresh region A2 is 40 Hz, and the refreshing maintains at a low rate. It should be understood that the refresh rates of the pixel units 101 in the first dynamic refresh region A1 and the second dynamic refresh region A2 are set to other values, which are not listed here.

One or more first transition refresh regions B1 are disposed at the boundary between the first dynamic refresh region A1 and the second dynamic refresh region A2, and the refresh rate of the pixel units 101 in each of the first transition refresh regions B1 is between the refresh rates of the pixel units 101 in the first dynamic refresh region A1 and the second dynamic refresh region A2. In the embodiments of the present disclosure, one first transition refresh region B1 is taken as an example for description. The number of rows of the pixel units 101 in the first transition refresh region B1 is at least less than the number of rows of the pixel units 101 in the second dynamic refresh region A2. For example, the number of rows of the pixel units 101 in the first transition refresh region B1 is one-fiftieth to one-thirtieth of the number of rows of the pixel units 101 in the second dynamic refresh region A2, for example, five rows, ten rows, etc. The number of rows of the pixel units 101 in the first transition refresh region B1 is much less than the number of rows of the pixel units 101 in the first dynamic refresh region A1 and the second dynamic refresh region A2. With this design, the number of rows of the pixel units 101 in the first transition refresh region B1 cannot exceed the number of rows of the pixel units 101 in the first dynamic refresh region A1 and the second dynamic refresh region A2, so as to avoid affecting the normal display images.

In the display panel according to the embodiments of the present disclosure, at least one first transition refresh region B1 with a refresh rate between refresh rates of the first dynamic refresh region A1 and the second dynamic refresh region A2 is arranged between the first dynamic refresh region A1 and the second dynamic refresh region A2, such that the presence of a distinct boundary region between the first dynamic refresh region A1 and the second dynamic refresh region A2 is prevented, and the luminance difference between two adjacent regions is weakened, thereby avoiding the presence of a distinct luminance boundary, such that the display effect of the display panel is improved, and the user experience is improved.

Specifically, the refresh rate of the pixel units 101 in the first dynamic refresh region A1 is greater than the refresh rate of the pixel units 101 in the second dynamic refresh region A2.

The refresh rate of the pixel units 101 in the first dynamic refresh region A1 is the highest refresh rate of the entire display panel, e.g., 120 Hz, and the display is performed at a high refresh rate. The refresh rate of the pixel units 101 in the second dynamic refresh rate A2 is a low refresh rate, e.g., 40 Hz, and the display is performed at a low refresh rate. Thus, the display can be performed at a low refresh rate in the case that the display at a high refresh rate is unnecessary, thereby reducing energy consumption.

In some embodiments, the refresh rate of the pixel units 101 in each of the first transition refresh regions B1 gradually decreases along a direction from the first dynamic refresh region A1 to the second dynamic refresh region A2.

In the case that the number of the first transition refresh regions B1 is multiple, the refresh rate of the pixel units 101 in each of the first transition refresh regions B1 is also different. Specifically, the refresh rate of the pixel units 101 in each of the first transition refresh regions B1 gradually decreases along a direction from the first dynamic refresh region A1 to the second dynamic refresh region A2, such that the luminance of each of the first transition refresh regions B1 changes slowly, and the luminance difference between two adjacent regions is further reduced, thereby avoiding the presence of a distinct luminance boundary, such that the display effect of the display panel is improved, and the user experience is improved. For example, the number of the first transition refresh regions B1 is three, and the refresh rates of pixel units 101 in the three first transition refresh regions B1 are 90 Hz, 60 Hz, and 50 Hz, respectively.

In some embodiments, the display region is further divided into a static retention region A3 and at least one second transition refresh region B2 between the second dynamic refresh region A2 and the static retention region A3; a refresh rate of pixel units 101 in the static retention region A3 is 1 HZ; a refresh rate of pixel units 101 in the at least one second transition refresh region B2 is between the refresh rates of the pixel units 101 in the second dynamic refresh region A2 and the static retention region A3.

The refresh rate of the pixel units 101 in the static retention region A3 is 1 HZ, and the static retention region A3 displays one frame of display image within one second, so as to further save energy consumption.

At least one second transition refresh region B2 with a refresh rate between refresh rates of the second dynamic refresh region A2 and the static retention region A3 is arranged between the second dynamic refresh region A2 and the static retention region A3, such that the presence of a distinct boundary region between the second dynamic refresh region A2 and the static retention region A3 is prevented, and the luminance difference between two adjacent regions is weakened, thereby avoiding the presence of a distinct luminance boundary, such that the display effect of the display panel is improved, and the user experience is improved.

In some embodiments, the refresh rate of the pixel units 101 in each of the second transition refresh regions B2 gradually decreases along a direction from the second dynamic refresh region A2 to the static retention region A3.

In the case that the number of the second transition refresh regions B2 is multiple, the refresh rate of the pixel units 101 in each of the second transition refresh regions B2 is also different. Specifically, the refresh rate of the pixel units 101 in each of the second transition refresh regions B2 gradually decreases along a direction from the second dynamic refresh region A2 to the static retention region A3, such that the luminance of each of the second transition refresh regions B2 changes slowly, and the luminance difference between two adjacent regions is further reduced, thereby avoiding the presence of a distinct luminance boundary, such that the display effect of the display panel is improved, and the user experience is improved. For example, the number of the second transition refresh regions B2 is four, and the refresh rates of pixel units 101 in the four second transition refresh regions B2 are 30 Hz, 20 Hz, 10 Hz, and 6 Hz, respectively.

It should be noted that, in the following description, the number of the first transition refresh region B1 is one, and the refresh rate thereof is 60 Hz; the number of the second transition refresh regions is four, and the refresh rates thereof are 30 Hz, 20 Hz, 10 Hz, and 6 Hz, respectively.

In some embodiments, as shown in FIG. 4, the display panel is further provided with a peripheral region disposed on at least one side of the display region, and the display panel further includes: a plurality of shift registers 102 and gating circuits 103 disposed in the peripheral region, wherein each of the shift registers 102 is connected to one row of the pixel units 101 through the gating circuit 103.

In some embodiments, the shift register 102 is a second gate drive circuit Ngate GOA, one end of the gating circuit 103 is connected to the second gate drive circuit Ngate GOA, and the other end thereof is connected to the gate of the threshold compensation transistor T2 in the pixel circuit of the corresponding row of the pixel units 101. In other embodiments, the shift register 102 is a first gate drive circuit Pgate GOA and a second gate drive circuit Ngate GOA, one end of the gating circuit 103 is connected to the first gate drive circuit Pgate GOA and the second gate drive circuit Ngate GOA, and the other end thereof is connected to the gate of the data writing transistor T4 and the gate of the threshold compensation transistor T2 in the pixel circuit of the corresponding row of the pixel units 101.

Figure 5A:
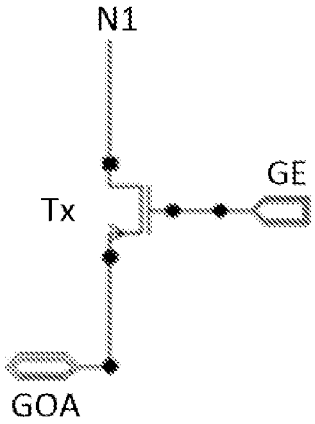
FIG. 5A is a schematic structural diagram of a gating circuit in the display panel shown in FIG. 4.

It can be understood that the gating circuit 103 is a switching transistor, and as shown in FIG. 5A, the gating circuit 103 includes: a gate transistor Tx having one end connected to the second gate drive circuit Ngate GOA and the other end connected to the first node N1 of the corresponding row of pixel units 101, such as the gate of the threshold compensation transistor T2 and the gate of the data writing transistor T4 in the pixel circuits of the corresponding row of the pixel units 101, and the gate of the gating transistor Tx is connected to a gating signal (GE). The gating transistor Tx transmits a gate drive signal of the shift register 102 to the corresponding row of pixel units 101 under the control of the corresponding GE.

In some embodiments, as shown in FIGS. 4 and 5A, the GE for controlling the on or off of the gating circuit 103 is provided by a driver integrated circuit (DIC), and the DIC is electrically connected to a processor of the display panel through a flexible printed circuit (FPC). The GE signal is pulled up or down to control the GOA signal to enter the pixel circuits of the corresponding row of pixel units 101, thereby controlling the data refresh rate.

In some embodiments, as the refresh rate is changing, the gating signal also needs to be changed. However, the shape of the gating signal cannot be predicted in advance, such that the problems of the frequency transition band and the ultra-low frequency are not solved in a preset form. Therefore, the following solutions are proposed.

Figure 5B:
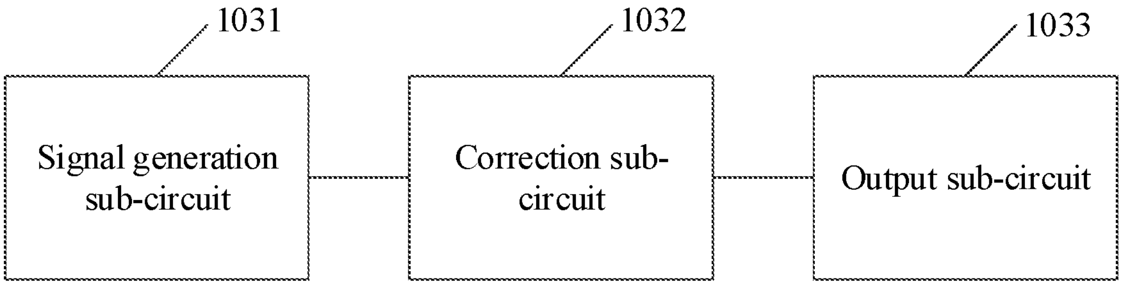
FIG. 5B is a schematic structural diagram of another gating circuit in the display panel shown in FIG. 4.

In some embodiments, FIG. 5B is another schematic structural diagram of the gating circuit in the display panel shown in FIG. 4. As shown in FIG. 5B, the gating circuit 103 further includes: a gating signal circuit. The gating signal circuit includes: a signal generation sub-circuit 1031, a correction sub-circuit 1032, and an output sub-circuit 1033. The gating signal circuit corrects the gating signal to acquire a corrected gating signal, and then controls the gate drive signal to enter the pixel circuits of the corresponding row of pixel units 101, thereby controlling the data refresh rate. The gating signal circuit is integrated in the DIC or in the gating circuit 103. It can be understood that in some embodiments, as can be seen from FIGS. 5A and 5B, the output sub-circuit 1033 of the gating signal circuit is connected to the gate of the gating transistor Tx.

The shift register 102 is configured to output a gate drive signal stage by stage according to a preset time sequence; the signal generation sub-circuit 1031 is configured to generate a gating signal according to the refresh rates of the pixel units 101 in the first dynamic refresh region A1 and the second dynamic refresh region A2; the correction sub-circuit 1032 is configured to correct the gating signal according to the refresh rate of the pixel units 101 in the first transition refresh region B1; the output sub-circuit 1033 is configured to input the gate drive signal to the corresponding pixel units under the control of a corrected gating signal.

A time sequence controller (not shown) in the display panel provides a time sequence signal to each of the shift registers 102, such that each of the shift registers 102 outputs a gate drive signal stage by stage to refresh each row of pixel units 102. The signal generation sub-circuit 1031 provides a gating signal, but the conventional gating signal controls the gate drive signal provided by each of the shift registers 102 only for the refresh rates of the pixel units 101 in the first dynamic refresh region A1 and the second dynamic refresh region A2, and the requirement of the refresh rate of the pixel units 101 in the first transition refresh region B1 cannot be met. The correction sub-circuit 1032 corrects the gating signal, such that the gating signal can meet both the requirements of the refresh rates of the pixel units 101 in the first dynamic refresh region A1 and the second dynamic refresh region A2 and the requirement of the refresh rate of the pixel units 101 in the first transition refresh region B1. The output sub-circuit 1033 inputs the gate drive signal to the corresponding pixel units under the control of the corrected gating signal. Therefore, the requirements of the refresh rates in all the regions can be met, such that the luminance difference between two adjacent regions is weakened, thereby avoiding the presence of a distinct luminance boundary, such that the display effect of the display panel is improved, and the user experience is improved.

In some embodiments, the correction sub-circuit 1032 is specifically configured to, acquire, according to the refresh rates of the pixel units in the first dynamic refresh region A1 and the second dynamic refresh region A2, the number of frames spaced between hopping of the gating signals corresponding to the first dynamic refresh region A1 and the second dynamic refresh region A2; acquire, according to the number of frames spaced between the hopping of the gating signals corresponding to the first dynamic refresh region A1 and the second dynamic refresh region A2, the number of frames spaced between hopping of the gating signal corresponding to each of the first transition refresh regions B1; and correct the gating signals according to the number of frames spaced between the hopping of the gating signal corresponding to each of the first transition refresh regions B1.

Figure 6:
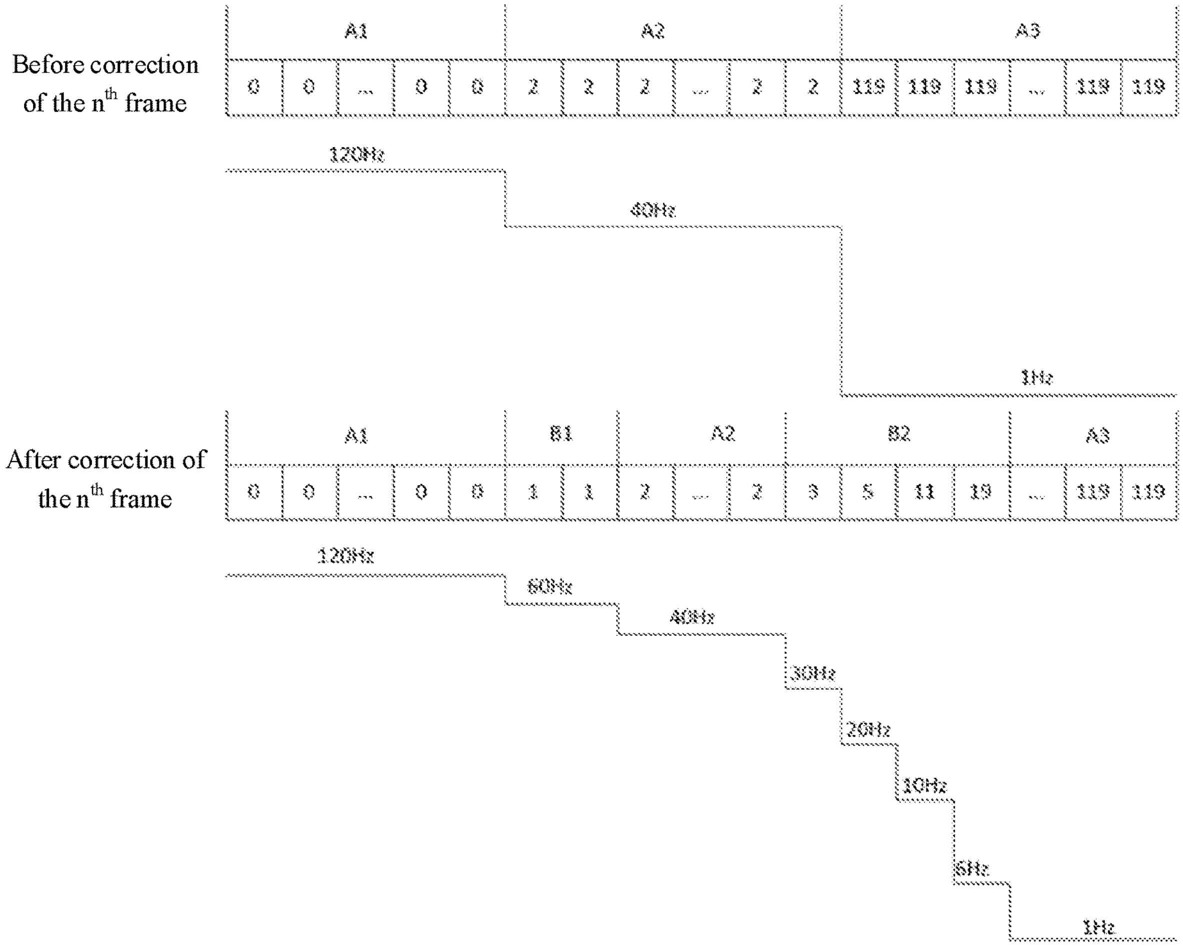
FIG. 6 is a schematic diagram illustrating frequency variation in a display panel according to some embodiments of the present disclosure.

Taking the refresh rates of the pixel units in the first dynamic refresh region A1 and the second dynamic refresh region A2 as 120 Hz and 40 Hz, respectively as an example, as shown in FIG. 6, in the case that a data signal of the first frame of display image is input, each row of pixel units 101 in the display panel are refreshed once, and the gating signal corresponding to each region is a low-level signal. The first dynamic refresh region A1 remains in a high refresh state at 120 Hz, the corresponding gating signal remains in a low-level state, and the number of frames spaced between the hopping is 0. The second dynamic refresh region A2 remains in a low refresh state at 40 Hz, and the corresponding gating signal hops once every two frames. The gating signal is corrected by adjusting the number of frames spaced between the hopping of the gating signal corresponding to the first transition refresh region B1 to be between the number of frames spaced between the hopping of the gating signals corresponding to the first dynamic refresh region A1 and the second dynamic refresh region A2, such that the gating signal meets the requirement of the refresh rate of the pixel units 101 in the first transition refresh region B1, and then the requirements of the refresh rates of all the regions are met, and thus the luminance difference between two adjacent regions is weakened, thereby avoiding the presence of a distinct luminance boundary, such that the display effect of the display panel is improved, and the user experience is improved. In some embodiments, the number of frames spaced between the hopping of the gating signal corresponding to each of the first transition refresh regions B1 gradually increases along a direction from the first dynamic refresh region A1 to the second dynamic refresh region A2.

In the case that the number of the first transition refresh regions B1 is multiple, the number of frames spaced between the hopping of the gating signal corresponding to each of the first transition refresh regions B1 is also different. Specifically, the number of frames spaced between the hopping of the gating signal corresponding to each of the first transition refresh regions B1 gradually increases along a direction from the first dynamic refresh region A1 to the second dynamic refresh region A2, such that the luminance of each of the first transition refresh regions B1 changes slowly, and the luminance difference between two adjacent regions is further weakened, thereby avoiding the presence of a distinct luminance boundary, such that the display effect of the display panel is improved, and the user experience is improved. In some embodiments, the signal generation sub-circuit 1031 is further configured to generate a gating signal according to the refresh rate of the pixel units in the static retention region A3; the correction sub-circuit 1032 is further configured to correct the gating signal according to the refresh rate of the pixel units in the second transition refresh region B2.

The refresh rate of the pixel units in the static retention region A3 is 1 Hz, and as shown in FIG. 6, in the case that a data signal of the first frame of a display image is input, each row of pixel units 101 in the display panel are refreshed once, and the gating signal corresponding to each region is a low-level signal. The static retention region A3 remains in a static display state, the corresponding gating signal remains in a high-level state, and the number of frames spaced between the hopping is 119. The second dynamic refresh region A2 remains in a low refresh state at 40 Hz, and the corresponding gating signal hops once every two frames. The gating signal is corrected by adjusting the number of frames spaced between the hopping of the gating signal corresponding to the second transition refresh region B2 to be between the number of frames spaced between the hopping of the gating signals corresponding to the second dynamic refresh region A2 and the static retention region A3, such that the gating signal meets the requirement of the refresh rate of the pixel units 101 in the second transition refresh region B2, and then the requirements of the refresh rates of all the regions are met, and thus the luminance difference between two adjacent regions is weakened, thereby avoiding the presence of a distinct luminance boundary, such that the display effect of the display panel is improved, and the user experience is improved.

In the case that the number of the second transition refresh regions B2 is multiple, the number of frames spaced between the hopping of the gating signal corresponding to each of the second transition refresh regions B2 is also different. Specifically, the number of frames spaced between the hopping of the gating signal corresponding to each of the second transition refresh regions B2 gradually increases along a direction from the second dynamic refresh region A2 to the static retention region A3, such that the luminance of each of the second transition refresh regions B2 changes slowly, and the luminance difference between two adjacent regions is further reduced, thereby avoiding the presence of a distinct luminance boundary, such that the display effect of the display panel is improved, and the user experience is improved. For example, the number of the second transition refresh regions B2 is four, and the number of frames spaced between the hopping of the gating signals corresponding to the four second transition refresh regions B2 is 3, 5, 11, and 19, respectively.

In some embodiments, as can be seen from FIG. 6, the first transition refresh region B1 includes a plurality of refresh rates, and the second transition refresh region B2 includes a plurality of refresh rates, wherein the number of the refresh rates of the first transition refresh region B1 is less than that of the refresh rates of the second transition refresh region B2, and the decreasing amplitude of the refresh rates of the first transition refresh region B1 is greater than that of the refresh rates of the second transition refresh region B2. For example, the number of the first transition refresh regions B1 is three, the refresh rates of the pixel units 101 in the three first transition refresh regions B1 are 100 Hz, 80 Hz, and 60 Hz, respectively, and the refresh rate is decreased by about 20 Hz; the number of the second transition refresh regions B2 is four, the refresh rates of the pixel units 101 in the four first transition refresh regions B1 are 30 Hz, 20 Hz, 10 Hz, and 6 Hz, respectively, and the refresh rate is decreased by about 10 Hz. With this design, the luminance difference between two adjacent regions is weakened, thereby avoiding the presence of a distinct luminance boundary; in addition, the refresh rate in a low refresh rate region (for example, below 40 Hz) changes relatively more times than that of a high refresh rate region (for example, above 40 Hz), and the refresh rate changes more gently, further improving the user experience, and reducing power consumption.

In some embodiments, at the end of a display period, the gating signal corresponding to the static retention region A3 is forced to make a one-time hopping.

Figure 7:
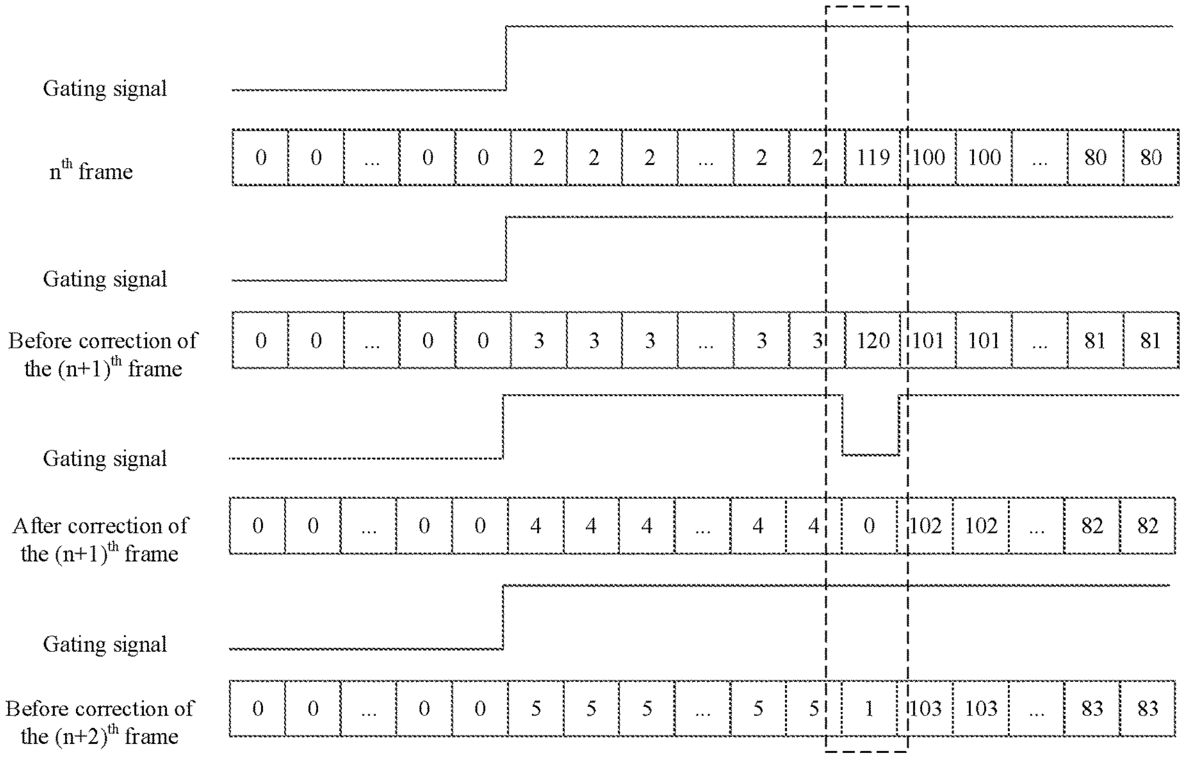
FIG. 7 is a schematic diagram illustrating hopping of a gating signal in a display panel according to some embodiments of the present disclosure.

According to the hopping rule, the gating signal corresponding to the static retention region A3 remains at a high level, such that the refresh rate of the pixel units 101 in the region is lower than 1 Hz, and then the problem of an ultra-low refresh rate is present. The current display panel does not support ultra-low refresh rate display. As shown in FIG. 7, at the end of a display period, the gating signal corresponding to the static retention region A3 is forced to make a one-time hopping, such that the gating signal corresponding to the static retention region A3 hops to a low level, and the refreshing is performed once, thereby avoiding an ultra-low frequency phenomenon, and ensuring normal display of the display panel.

In a second aspect, the embodiments of the present disclosure provide a display device. The display device includes the display panel according to any of the above embodiments, and the display device is specifically an electronic device with a display function, such as a mobile phone, a smart television, a tablet computer, a notebook computer, and a vehicle-mounted navigator, the realization principle and beneficial effects of which are the same as the realization principle and beneficial effects of the above-mentioned display panel, and will not be repeated herein.

In a third aspect, the embodiments of the present disclosure provide a method for driving the display panel according to any of the above embodiments. The method for driving the display panel includes S301 to S304.

In S301, a gate drive signal is output stage by stage according to a preset time sequence.

In S302, a gating signal is generated according to the refresh rates of the pixel units in the first dynamic refresh region and the second dynamic refresh region.

In S303, the gating signal is corrected according to the refresh rate of the pixel units in the first transition refresh region.

In S304, the gate drive signal is input to the corresponding pixel units under the control of a corrected gating signal.

In some embodiments, prior to S304 of inputting the gate drive signal to the corresponding pixel units under the control of the corrected gating signal, the method further includes:

S302*a*, generating a gating signal according to the refresh rates of the pixel units in the second dynamic refresh region and the static retention region; and

S303*a*, correcting the gating signal according to the refresh rate of the pixel units in the second transition refresh region.

In the method for driving the display panel provided in the present disclosure, the gating signal is corrected, then the corrected gating signal is utilized to control the gate drive signal to enter the pixel circuits of the corresponding row of pixel units, thereby controlling the data refresh rate. For example, the refresh rate of the first transition refresh region B1 is controlled to be between the refresh rates of the first dynamic refresh region A1 and the second dynamic refresh region A2, and the refresh rate of the second transition refresh region B2 is controlled to be between the refresh rates of the second dynamic refresh region A2 and the static retention region A3, thus preventing the presence of a distinct boundary region between the first dynamic refresh region A1 and the second dynamic refresh region A2, or between the second dynamic refresh region A2 and the static retention region A3, such that the luminance difference between two adjacent regions is weakened, thereby avoiding the presence of a distinct luminance boundary, such that the display effect of the display panel is improved, and the user experience is improved.

It may be understood that the above embodiments are merely exemplary embodiments employed to illustrate the principles of the present disclosure, and the present disclosure is not limited thereto. It will be apparent to those of ordinary skill in the art that various changes and modifications can be made without departing from the spirit and scope of the present disclosure, and these changes and modifications are also considered to fall within the scope of the present disclosure.

What is claimed is:

1. A display panel, wherein the display panel is provided with a display region and comprises a plurality of pixel units disposed in arrays in the display region;

wherein the display region is divided into a first dynamic refresh region, a second dynamic refresh region, and at least one first transition refresh region between the first dynamic refresh region and the second dynamic refresh region;

a refresh rate of pixel units in the first dynamic refresh region is different from a refresh rate of pixel units in the second dynamic refresh region;

a refresh rate of pixel units in each of the first transition refresh regions is between the refresh rates of the pixel units in the first dynamic refresh region and the second dynamic refresh region; and a number of rows of the pixel units in the first transition refresh region is at least less than a number of rows of the pixel units in the first dynamic refresh region and a number of rows of the pixel units in the second dynamic refresh region, wherein the refresh rate of the pixel units in the first dynamic refresh region is greater than the refresh rate of the pixel units in the second dynamic refresh region, wherein the refresh rate of the pixel units in each of the first transition refresh regions gradually decreases along a direction from the first dynamic refresh region to the second dynamic refresh region, wherein the display region is further divided into a static retention region, and at least one second transition refresh region between the second dynamic refresh region and the static retention region;

a refresh rate of pixel units in the static retention region is 1 Hz;

a refresh rate of pixel units in the at least one second transition refresh region is between the refresh rates of the pixel units in the second dynamic refresh region and the static retention region.

2. The display panel according to claim 1, wherein the refresh rate of the pixel units in each of the second transition refresh regions gradually decreases along a direction from the second dynamic refresh region to the static retention region.

3. The display panel according to claim 2, wherein the display panel is further provided with a peripheral region disposed on at least one side of the display region, and the display panel further comprises a plurality of shift registers and gating circuits disposed in the peripheral region, wherein each of the shift registers is connected to one row of the pixel units through the gating circuit; the gating circuit comprises a signal generation sub-circuit, a correction sub-circuit, and an output sub-circuit; and the shift register is configured to output a gate drive signal stage by stage according to a preset time sequence;

wherein the signal generation sub-circuit is configured to generate a gating signal according to the refresh rates of the pixel units in the first dynamic refresh region and the second dynamic refresh region;

the correction sub-circuit is configured to correct the gating signal according to the refresh rate of the pixel units in the first transition refresh region; and the output sub-circuit is configured to input the gate drive signal to corresponding pixel units under a control of a corrected gating signal.

4. The display panel according to claim 3, wherein the signal generation sub-circuit is further configured to generate a gating signal according to the refresh rate of the pixel units in the static retention region;

the correction sub-circuit is further configured to correct the gating signal according to the refresh rate of the pixel units in the second transition refresh region.

5. The display panel according to claim 4, wherein the correction sub-circuit is further specifically configured to, acquire, according to the refresh rate of the pixel units in the static retention region, a number of frames spaced between hopping of gating signal corresponding to the static retention region;

acquire, according to a number of frames spaced between the hopping of the gating signals corresponding to the second dynamic refresh region and the static retention region, a number of frames spaced between hopping of gating signal corresponding to the second transition refresh region; and correct the gating signals according to the number of frames spaced between the hopping of the gating signal corresponding to the second transition refresh region.

6. The display panel according to claim 5, wherein the number of frames spaced between the hopping of the gating signal corresponding to the second transition refresh region is between the number of frames spaced between the hopping of the gating signals corresponding to the second dynamic refresh region and the static retention region.

7. The display panel according to claim 5, wherein the number of frames spaced between the hopping of the gating signal corresponding to each of the second transition refresh regions gradually increases along the direction from the second dynamic refresh region to the static retention region.

8. The display panel according to claim 7, wherein at an end of a display period, the gating signal corresponding to the static retention region is forced to make a one-time hopping.

9. The display panel according to claim 3, wherein the correction sub-circuit is specifically configured to, acquire, according to the refresh rates of the pixel units in the first dynamic refresh region and the second dynamic refresh region, a number of frames spaced between hopping of gating signals corresponding to the first dynamic refresh region and the second dynamic refresh region;

acquire, according to the number of frames spaced between the hopping of the gating signals corresponding to the first dynamic refresh region and the second dynamic refresh region, a number of frames spaced between hopping of gating signal corresponding to the first transition refresh region; and correct the gating signals according to the number of frames spaced between the hopping of the gating signal corresponding to the first transition refresh region.

10. The display panel according to claim 9, wherein the number of frames spaced between the hopping of the gating signal corresponding to each of the first transition refresh regions gradually increases along the direction from the first dynamic refresh region to the second dynamic refresh region.

11. The display panel according to claim 9, wherein the number of frames spaced between the hopping of the gating signal corresponding to the first transition refresh region is between the number of frames spaced between the hopping of the gating signals corresponding to the first dynamic refresh region and the second dynamic refresh region.

12. A method for driving the display panel according to claim 1, wherein the method for driving the display panel comprises:

outputting a gate drive signal stage by stage according to a preset time sequence;

generating a gating signal according to the refresh rates of the pixel units in the first dynamic refresh region and the second dynamic refresh region;

correcting the gating signal according to the refresh rate of the pixel units in the first transition refresh region; and inputting the gate drive signal to corresponding pixel units under a control of a corrected gating signal.

13. The method for driving the display panel according to claim 12, wherein prior to inputting the gate drive signal to the corresponding pixel units under the control of the corrected gating signal, the method further comprises:

generating a gating signal according to the refresh rates of the pixel units in the second dynamic refresh region and refresh rates of pixel units in a static retention region; and correcting the gating signal according to refresh rate of pixel units in a second transition refresh region.

14. A display device, wherein the display device comprises a display panel, wherein the display panel is provided with a display region and comprises a plurality of pixel units disposed in arrays in the display region;

wherein the display region is divided into a first dynamic refresh region, a second dynamic refresh region, and at least one first transition refresh region between the first dynamic refresh region and the second dynamic refresh region;

a refresh rate of pixel units in the first dynamic refresh region is different from a refresh rate of pixel units in the second dynamic refresh region;

a refresh rate of pixel units in each of the first transition refresh regions is between the refresh rates of the pixel units in the first dynamic refresh region and the second dynamic refresh region; and a number of rows of the pixel units in the first transition refresh region is at least less than a number of rows of the pixel units in the first dynamic refresh region and a number of rows of the pixel units in the second dynamic refresh region, wherein the refresh rate of the pixel units in the first dynamic refresh region is greater than the refresh rate of the pixel units in the second dynamic refresh region, wherein the refresh rate of the pixel units in each of the first transition refresh regions gradually decreases along a direction from the first dynamic refresh region to the second dynamic refresh region, wherein the display region is further divided into a static retention region, and at least one second transition refresh region between the second dynamic refresh region and the static retention region;

a refresh rate of pixel units in the static retention region is 1 Hz;

a refresh rate of pixel units in the at least one second transition refresh region is between the refresh rates of the pixel units in the second dynamic refresh region and the static retention region.

* * * * *